Dec. 22, 1936.  E. L. BROWN  2,065,168
HYDRAULIC BRAKING SYSTEM
Filed Aug. 20, 1935  3 Sheets-Sheet 1
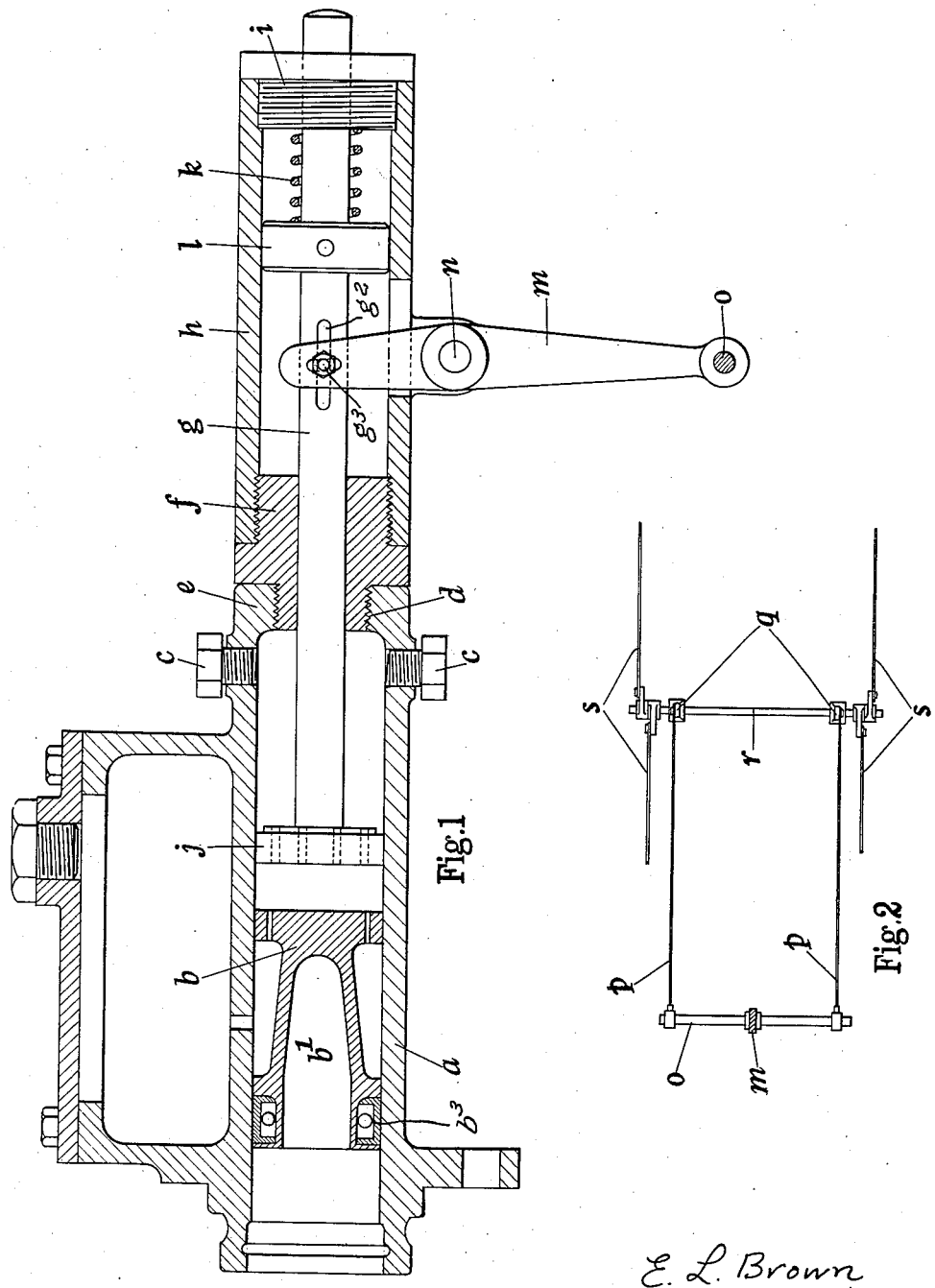
E. L. Brown
Inventor
By: Glascock Downing & Seebold
Attys.

Dec. 22, 1936.  E. L. BROWN  2,065,168
HYDRAULIC BRAKING SYSTEM
Filed Aug. 20, 1935  3 Sheets-Sheet 2
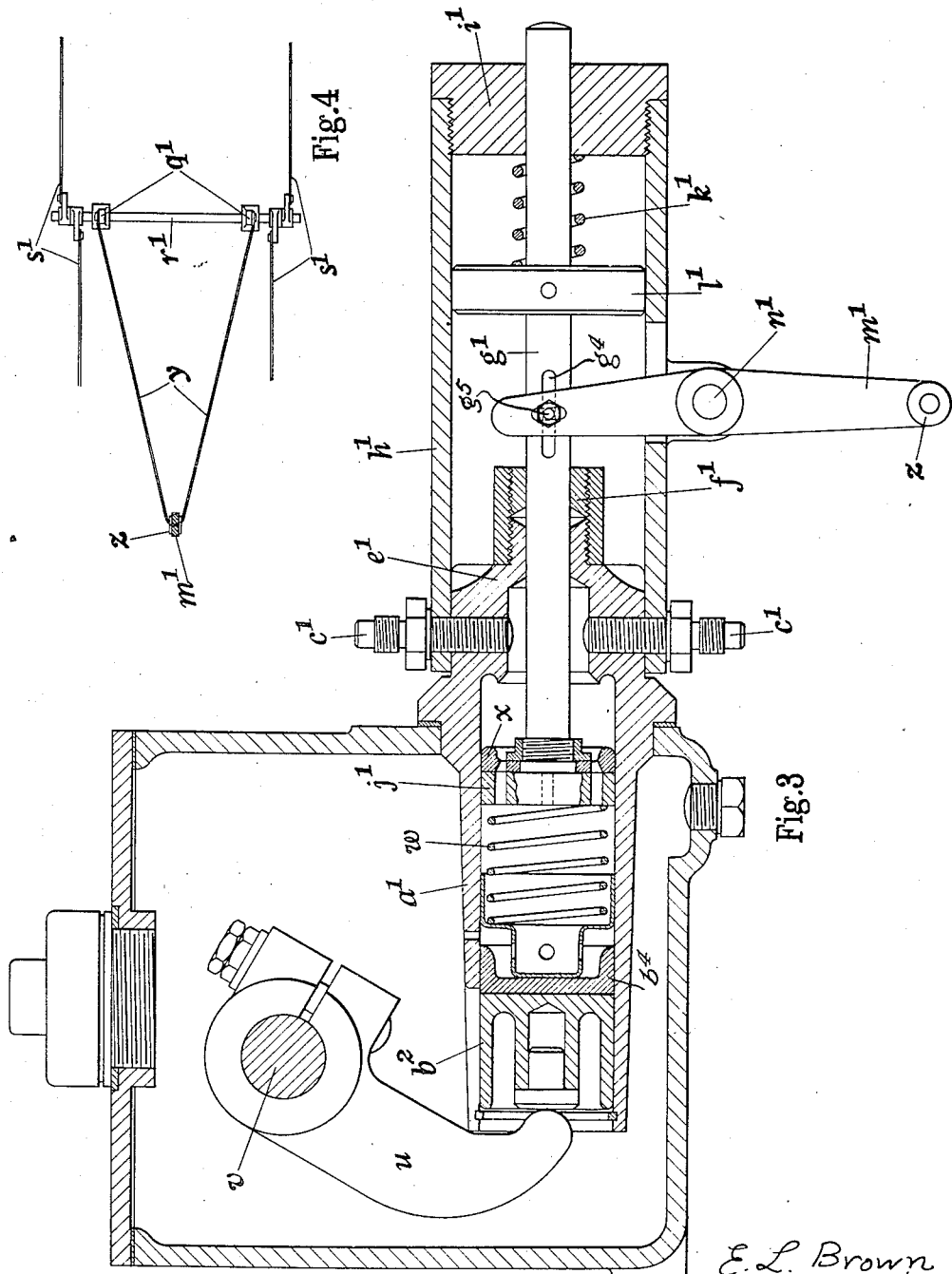
E. L. Brown
inventor
By Glasco & Downing & Seebold
Attys.

Dec. 22, 1936.   E. L. BROWN   2,065,168
HYDRAULIC BRAKING SYSTEM
Filed Aug. 20, 1935   3 Sheets-Sheet 3

Patented Dec. 22, 1936

2,065,168

UNITED STATES PATENT OFFICE 2,065,168

HYDRAULIC BRAKING SYSTEM

Edmund Louis Brown, Bowdon, England

Application August 20, 1935, Serial No. 37,073
In Great Britain August 30, 1934

8 Claims. (Cl. 188—152)

This invention comprises improvements in or relating to hydraulic braking systems and its object is to ensure that in the event of a leakage of hydraulic fluid from the system the actuation of the control which normally applies the hydraulic brakes shall instead apply brakes mechanically.

With existing hydraulic braking systems any leakage of a pressure line or other leakage empties the whole of the hydraulic system and none of the brakes can be applied. No warning of this state of affairs is given until the brake control is actuated and the failure discovered. The dangerous nature of such an occurrence, particularly when the braking system is employed upon a motor vehicle, is obvious.

My invention accordingly comprises an hydraulic braking system in which in the event of leakage of the hydraulic fluid the control which normally applies the hydraulic brakes, on actuation and on failing to meet the normal resistance caused by the pressure of the said fluid, is arranged to actuate brakes mechanically.

Preferably the piston normally actuating the hydraulic brakes is arranged if it does not meet the usual resistance from the fluid to travel beyond the customary stroke and contact a movable abutment within the cylinder, by movement of which brakes are mechanically applied.

Further features of my invention will be apparent from the following description of the accompanying drawings and will be more fully pointed out in the appended claims. It is to be understood that the invention is not limited to the constructions to be described but only in so far as the prior art and the scope of the appended claims may require.

In the drawings:—

Figure 1 is a vertical sectional elevation through one known type of hydraulic master cylinder (known commercially as the barrel type) modified in accordance with the invention.

Figure 2 is a plan view of the mechanism connecting the device shown in Figure 1 to the customary mechanically operated brakes.

Figure 3 is a view similar to Figure 1, showing the invention applied to a second known type of hydraulic master cylinder (known commercially as the tank type).

Figure 4 is a view similar to Figure 2 but referring to Figure 3, and

Figure 5:
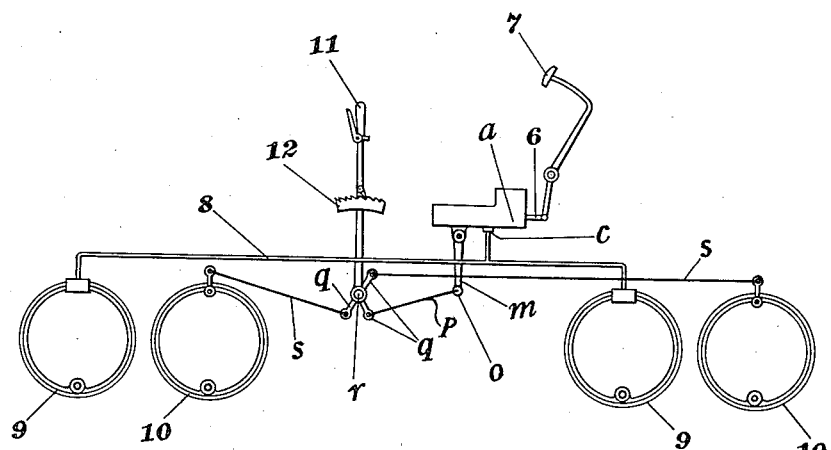
Figure 5 is a diagrammatic sketch showing the general arrangement of the hydraulically and mechanically operable brakes.

Referring first to Figure 1, the standard hydraulic master cylinder of the barrel type is shown at $a$. At $b$ is shown the normal hydraulic piston operated by the usual rod 6 (see Figure 5) from the brake pedal 7 entering the conical hollow $b^1$ in the piston. The unions to which are joined the oil pipes 8 to the hydraulic brakes are shown at $c$.

The piston $b$ is provided with packing material $b^3$ to ensure an oil tight seal between the piston and the cylinder walls.

The hydraulic brakes are indicated at 9, Figure 5; there are four such brakes upon the customary four wheels of an automobile but for clearness only two are shown in the diagram.

The mechanically operable brakes are indicated at 10. There may be four such brakes and they may act in known manner upon the same brake drums as the hydraulically operable brakes 9, only two brakes 10 are shown in the diagram for the sake of clearness. The brakes 10 are on the same wheels as the hydraulically operable brakes 9, but for the sake of clearness the brakes 10 have been drawn alongside the brakes 9 in Figure 5. These brakes 10 are applied by the hand brake lever 11 furnished with a ratchet 12. Movement of the lever 11 rotates the brake cross-shaft $r$, bearing crank arms $q$ to which are attached rods, chains or cables $s$ by which the brakes 10 are applied. To one arm $q$ a link $p$ is joined which is connected to the lever $m$ and thus rotates the cross-shaft $r$ when the lever $m$ is moved by an abnormal movement of the hydraulic piston. Lever $m$, link $p$, that arm $q$ to which link $p$ is attached, form with the necessary connections of the hand brake a positive mechanical connection from the abutment carrying rod of the hydraulic brake to the hand operated brakes.

With the type of master cylinder $a$ shown in Figure 1 there is normally a tapped aperture $d$ in the closed end $e$ of the cylinder for attachment of a switch device controlling the stop light at the rear of the car. Into this tapped aperture I insert a bearing and oil-tight gland $f$ through which passes a piston rod $g$ axial in the cylinder. Threaded upon the bearing $f$ is a tube $h$ carrying at its further end a second bearing $i$ for the piston rod $g$.

The end of the piston rod $g$ within the cylinder is provided with an abutment which in the construction illustrated is constituted by a perforated piston $j$, which piston does not interfere with the normal flow of the oil along the chamber to the unions $c$.

This piston $j$ is located in the cylinder at a point beyond the normal travel of the hydraulic piston $b$. But should hydraulic piston $b$ fail to meet any resistance from the hydraulic fluid, owing to this having leaked away it travels beyond its normal stroke and contacts perforated piston $j$, moving the piston rod $g$ axially against the action of the restoring spring $k$ located between the bearing $j$ and a collar $l$ secured upon the piston rod $g$.

The rod $g$ is provided with a slot $g^2$ in which is clamped an adjustable pivot $g^3$ for the upper end of a lever $m$.

Movement of rod $g$ swings the lever $m$ adjustably pivoted thereto about its fulcrum $n$.

The lower end of lever $m$ (as is shown in Figure 2) carries a short cross-shaft $o$ to the ends of which are secured two cables $p$ connected to crank arms $q$ on the customary hand brake cross-shaft $r$. Movement of the short cross-shaft $o$ therefore rotates the cross-shaft $r$ which is normally rotated by the hand brake lever 11 and applies the customary mechanically operated brakes 10 through the medium of the cables $s$.

Instead of the cables $p$ equivalent rods, chains or the like may be employed.

Figure 3 shows a slightly modified form of the device of Figure 1. The tank type hydraulic master cylinder $a^1$ contains the normal hydraulic piston $b^2$ which is operated by the arm $u$ on the shaft $v$ turned on depression of the brake pedal. This piston is restored to its rest position by the spring $w$. The perforated piston is shown at $j^1$ and is provided with a washer $x$.

In this construction the tube $h^1$ carrying the bearing $i^1$ is held to the hydraulic cylinder by the oil unions $c^1$.

The parts $b^4, e^1, f^1, g^1, g^4, g^5, k^1, l^1, m^1, n^1, q^1, r^1$ and $s^1$ correspond respectively to the parts $b^3, e, f, g, g^2, g^3, k, l, m, n, q, r$ and $s$ previously described.

Instead of the lower end of the lever $m$ carrying a cross-shaft a single cable $y$ (as shown in Figure 4) is run through the eye $z$ at its lower end, the tension in the two halves of the cable $y$ being self-equalizing.

I desire to emphasize that with both the constructions above described the modifications necessary to adapt existing hydraulic braking systems in accordance with my invention can be carried out without any structural alterations of the existing mechanism and without in any way interfering with its normal functioning. The modifications can be effected very simply by removing detachable parts of the known mechanism and substituting a special attachment. Hence my invention is readily applicable to existing braking systems.

The above description of two constructional embodiments of my invention is given by way of example only, and the invention is not limited thereto, as modifications may be made within the scope of the appended claims.

What I claim is:—

1. A braking system comprising hydraulically operable brakes, a hydraulic master cylinder, hydraulic connections between said cylinder and brakes, a hydraulic piston in and arranged for movement along said cylinder, a lever to effect application of said hydraulically operable brakes, means operated by said lever to move said piston along said cylinder, mechanically operable brakes, a second lever to effect application of said mechanically operable brakes, a rod passing in oil tight manner through the end of said master cylinder remote from said piston moving means, an abutment on the end of said rod within said cylinder, passageways associated with said abutment to prevent said abutment forming an oil-tight seal in said cylinder, said abutment being located at a point beyond the normal stroke of said piston but arranged to be contacted by said piston if said piston exceeds said normal stroke and thereby to move said abutment-carrying rod, and a positive mechanical interconnection between said rod and said mechanically operable brakes whereby movement of said rod by said piston positively applies said mechanically operable brakes.

2. A braking system as claimed in claim 1 in which a bearing rigidly supported from but spaced from said cylinder supports the abutment-carrying rod specified.

3. A braking system as claimed in claim 1 in which said mechanical connection comprises a lever fulcrumed about a fixed point and pivoted at one end to said abutment-carrying rod, external to said cylinder, and a positive mechanical interconnection from the end of said lever remote from said rod to said mechanically operable brakes.

4. A braking system as claimed in claim 1 in which said mechanical connection comprises a lever adjustably pivoted at one end to said abutment-carrying rod external to said cylinder, a fulcrum-point for said lever rigidly supported from said cylinder, and a positive mechanical interconnection from the end of said lever remote from said rod to said mechanically operable brakes.

5. A braking system as claimed in claim 1 in which said mechanical connection comprises a lever fulcrumed about a fixed point and pivoted at one end to said abutment-carrying rod external to said cylinder, a cross-shaft carried by the other end of said lever, a further and rotatable cross-shaft parallel to the first-mentioned cross-shaft, arranged for rotation on movement of the lever or pedal specified to apply the mechanically operable brakes specified, crank arms carried by said further cross-shaft, two cables connecting the ends of the first-mentioned cross-shaft to two of said crank arms and four cables attached to four of said crank arms and serving to apply the mechanically operable brakes.

6. A braking system as claimed in claim 1 in which said mechanical connection comprises a lever fulcrumed about a fixed point and pivoted at one end to said abutment-carrying rod external to said cylinder, a cross-shaft bearing crank arms and arranged for rotation on movement of the lever or pedal specified to apply the mechanically operable brakes, four cables connecting four of said crank arms to said mechanically operable brakes, an eye at the end of said lever remote from said abutment-carrying rod, and a cable passing through said eye and attached at its ends to two of said crank arms.

7. A braking system as claimed in claim 1 comprising also a spring to restore said abutment to its initial position after movement therefrom by said hydraulic piston and subsequent movement of said hydraulic piston away from said abutment.

8. An attachment for affixing to the hydraulic master cylinder of a hydraulic braking system, comprising a framework adapted to be rigidly secured to said cylinder, a rod adapted to be inserted in oil-tight manner through the end of and co-axial with said cylinder, bearings for said rod carried by said framework, an abutment at the end of said rod, passageways associated with said abutment, said abutment being adapted to lie in said cylinder at a point beyond the normal stroke of the hydraulic piston, spring means carried by said framework adapted to restore said abutment to said point, and a lever pivoted to said rod and fulcrumed about a fixed point on said framework.

EDMUND LOUIS BROWN.